UNITED STATES PATENT OFFICE.

CHARLES B. JACOBS, OF BLOOMFIELD, NEW JERSEY, ASSIGNOR, BY MESNE ASSIGNMENTS, TO AIR REDUCTION COMPANY, INCORPORATED, A CORPORATION OF NEW YORK.

PROCESS FOR THE SEPARATION OF CYANID COMPOUNDS FROM OTHER SUBSTANCES.

1,311,232. Specification of Letters Patent. Patented July 29, 1919.

No Drawing. Application filed November 7, 1916. Serial No. 130,089.

*To all whom it may concern:*

Be it known that I, CHARLES B. JACOBS, a citizen of the United States, residing at Bloomfield, in the county of Essex and State of New Jersey, have invented certain new and useful Improvements in Processes for the Separation of Cyanid Compounds from other Substances, of which the following is a full, clear, and exact description, such as will enable others skilled in the art to which it appertains to make and use the same.

This invention relates to methods of separating cyanid compounds from other substances, and with respect to its more specific features to methods of separating alkali metal cyanids from other alkali metal compounds, as alkali metal carbonates, and also from alkali metal hydrates and oxids which may exist with the alkali metal carbonates.

The object of the invention is the provision of an efficient and practical method for effecting the separation of the substances aforesaid economically, efficiently and rapidly.

The invention accordingly consists in the several steps and the relation and order of one or more of such steps with relation to each of the others thereof, which will be exemplified in the hereinafter disclosed method, and the scope of the application of which will be indicated in the claims that follow.

Inasmuch as the invention well manifests itself when considered in connection with the separation of solid sodium cyanid from solid sodium carbonate, the disclosure herein will be given in connection with such substances mainly, reference being made to some of the auxiliary substances and treatment which may be of advantage under the exigencies encountered in practice.

The mixture from which the cyanid is to be separated may be the mixture of sodium cyanid and sodium carbonate which is the product of various processes having for their object the production of sodium cyanid. Such product may consist of sodium cyanid mixed with sodium carbonate, or some hydrate and oxid may be present, as for instance sodium hydrate and sodium oxid. This mixture is treated with an amount of a solvent, in the present instance water, just sufficient to dissolve the sodium cyanid present. It is found that water at ordinary temperatures (approximately 20°-24° C.) will take into solution approximately 65 parts by weight of sodium cyanid for every 100 parts by weight of water, and also that at the same temperatures 100 parts by weight of water will dissolve 21 to 26 parts by weight of sodium carbonate, so that the same, or unit, weight of water will dissolve a greater amount of the cyanid compound than of the other substance, sodium carbonate. It has also been found that the dissolving action of the water on the sodium cyanid takes place more rapidly than on sodium carbonate, being approximately 2.65 times as fast. It has also been found that one hundred parts by weight of a saturated solution of sodium cyanid in water will only dissolve approximately 0.79 parts by weight of sodium carbonate at the temperatures above mentioned, instead of from 21 to 26 parts that would be dissolved by pure water in the absence of the sodium cyanid.

Having treated the mixture, comprising sodium cyanid in the presence of sodium carbonate, with just a sufficient weight of water to dissolve the sodium cyanid as above stated, and in accordance with the indications just explained, the water takes up the sodium cyanid in preference to, or at least in such greatly increased proportion to the taking up of the sodium carbonate, that its action is practically selective, and the sodium cyanid is dissolved practically to the exclusion of the sodium carbonate, forming a saturated solution of the cyanid which has practically no further dissolving action on the sodium carbonate. The residue from this dissolving operation is then separated from the solution, as by filtering, and the filtrate, consisting of a practically pure solution of sodium cyanid is evaporated to dryness, preferably *in vacuo*, and commercially pure sodium cyanid thus obtained. The residue from the filtering operation will be composed of sodium carbonate together with a certain amount of the sodium cyanid solution trapped mechanically in the voids of the solid residue. This residue is washed by displacement with small portions of fresh water so as to mechanically separate any liquid residue of sodium cyanid from the aggregate residue, and this wash water may be used in conjunction with the next batch of cyanid and carbonate mixture. The ultimate, or resultant residue of sodium carbonate on the filter may be dried and subsequently utilized as desired.

Should any sodium hydrate be present in the mixture to be treated for the separation of the cyanid, just sufficient bicarbonate of soda should be added to the water to convert the sodium hydrate into sodium carbonate. Should any sodium oxid be present in the mixture from which the sodium cyanid is to be separated, it will be convertel into sodium hydrate as soon as water is brought in contact therewith.

In this wise, by taking advantage of the relative speed of solubility of sodium cyanid as compared with that of sodium carbonate, and by further taking advantage of the fact that the same weight of water will dissolve a greater amount of sodium cyanid than of sodium carbonate, a novel selective method for the separation of these substances is attained, the water being a solvent selective relative to the cyanid and the carbonate, as before explained.

In the practical carrying out of the process, the mixed mass to be separated should preferably be in a physical condition readily adapted for being dissolved, as in a granular or powdered condition. The water or solvent with which the mixture is to be treated may be placed in a vessel and the mixing of the mixture with the water accomplished progressively and slowly, the water being preferably agitated while the mixture is being added so as to facilitate the dissolving operation. The relative amounts of the substances presented in the mixture may be determined by analysis, and the amount of water which is just sufficient to dissolve the sodium cyanid present may be calculated, 100 parts by weight of water being utilized for every 65 parts by weight of the cyanid. Similarly, the amount of bicarbonate of soda required may be calculated. As soon as the solution of the cyanid has been effected, it is usually at once separated from the residue of undissolved substances, although no substantial deleterious effects have been observed by retaining the residue in the solution.

By the above described method practically commercially pure sodium cyanid is obtained. Some traces of sodium carbonate in the resultant product may be found, but the amount thereof is usually so small as to be negligible, the method having been practised to such efficiency that sodium carbonate is present only to the extent of 7% or less.

Thus by the above described method are accomplished, among others, the objects hereinbefore referred to.

As many changes could be made in carrying out the above process without departing from the scope of the invention, it is intended that all matter contained in the above description shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. The method of separating alkali metal cyanid from a mixture containing said cyanid, together with alkali metal hydrate, which comprises, treating said mixture with water in the presence of alkali metal bicarbonate to convert said hydrate into alkali metal carbonate and to form a solution of alkali metal cyanid in the presence of the carbonate, and thereafter separating the solution from the residue.

2. The method of separating alkali metal cyanid from a mixture containing such cyanid, alkali metal carbonate and alkali metal hydrate which comprises, treating said mixture with water in the presence of alkali metal bicarbonate in sufficient quantity to convert the hydrate into alkali metal carbonate and to form a solution of alkali metal cyanid, and thereafter separating the latter solution from the residue.

3. The method of separating sodium cyanid from a mixture containing such cyanid and sodium hydrate which comprises, treating said mixture with water in the presence of sodium bicarbonate in sufficient quantity to convert the hydrate into sodium carbonate and to form a solution of sodium cyanid and thereafter separating the latter solution from the residue.

4. The method of separating sodium cyanid from sodium carbonate and sodium hydrate which comprises, treating the mixture with a solution containing sodium bicarbonate in sufficient quantity to convert the hydrate of said mixture into sodium carbonate and to form a solution of the sodium cyanid in the presence of said carbonate.

In testimony whereof I affix my signature, in the presence of two witnesses.

CHARLES B. JACOBS.

Witnesses:
J. W. ANDERSON,
C. J. KULBERG.